July 25, 1950  F. G. SWAN  2,516,434
SPINNER
Filed July 7, 1947
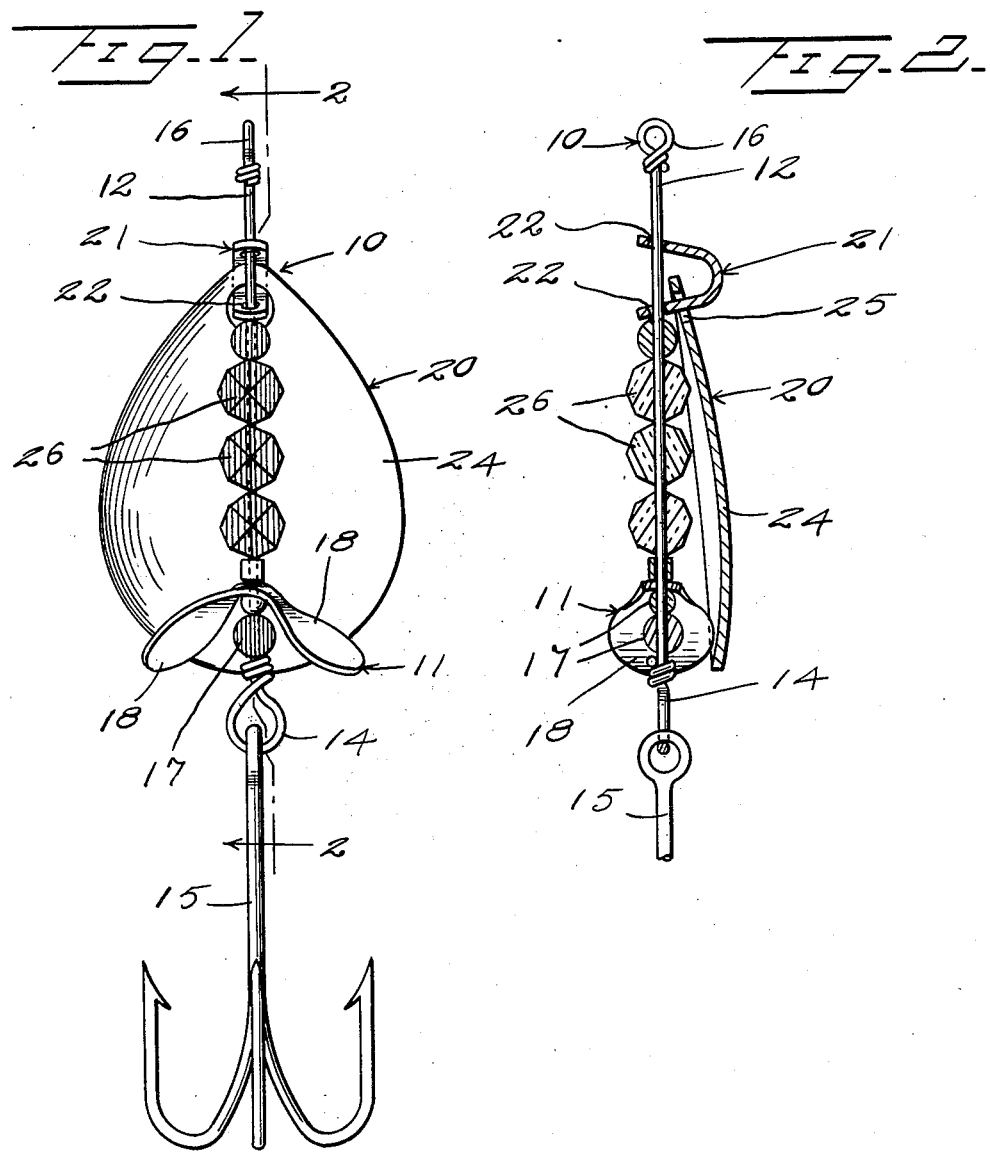
Inventor
Floyd G. Swan
By
Kimmel & Crowell  Attorneys Patented July 25, 1950

2,516,434

UNITED STATES PATENT OFFICE 2,516,434

SPINNER

Floyd G. Swan, Eureka, Calif.

Application July 7, 1947, Serial No. 759,371

2 Claims. (Cl. 43—42.14)

This invention relates to fishing lures, and more particularly to an improved spinner.

It is an object of this invention to provide an improved fishing spinner of the kind to be more particularly described hereinafter, having a front and rear spinner so constructed and arranged that the front spinner or spoon will revolve about the rear spinner or small propeller for attracting the fish to the hook.

Another object of this invention is to provide an improved fishing spinner of this kind in which the rear spinner is disposed immediately adjacent to the front end of the hook or hooks carried by the lure.

Still another object of this invention is to provide a spinner of this kind having a front spinner or spoon rotatably and pivotally carried by the main supporting shaft so the spoon may be free to revolve and fold back about the rear spinner.

With the above and other objects in view, my invention consists in the arrangement, combination and details of construction disclosed in the drawings and specification, and then more particularly pointed out in the appended claims.

In the drawing,

Figure 1 is a side elevation of a spinner constructed according to an embodiment of this invention, Figure 2 is a vertical section taken on the line 2—2 of Figure 1.

Referring to the drawing, the numeral 10 designates generally a fishing lure having a pair of longitudinally offset spinners mounted on a shaft immediately in front of a hook. The construction of the fishing lure 10 is such that a small spinner 11 is rotatably mounted on the supporting shaft 12 near the rear end immediately forward of the eye 14 on the rear end of the shaft 12, to which eye the hook 15 is loosely secured. A second eye 16 is formed on the front end of the shaft 12 for attachment to the fishing line.

The rear spinner 11 is spaced forwardly from the rear eye 14 by a pair of beads or bearings 17. The rear spinner 11 is formed with a pair of oppositely disposed blades 18 which are adapted to rotate the spinner 11 as the lure 10 is drawn through the water. A second enlarged spinning member 20 is rotatably mounted on the front end of the shaft 12 and is so constructed as to substantially overlie the small rear spinner 11 in its revolution.

A U-shaped bearing member 21 is loosely and rotatably mounted on the shaft 12 immediately behind the forward eye 16. The U-shaped bearing member 21 is formed with openings 22 through the free end of the arms thereof through which the shaft 12 loosely engages. The spinning member 20 is formed of a concavo-convex spoon 24 which is pivotally mounted on the bearing member 21.

The spoon 24 is provided at its upper or forward end with an opening 25, which loosely engages the length of the bearing member 21. In this arrangement the spoon 24 may be pivoted about the bearing member 21 to hang loosely therefrom and the rear end of the spoon will extend as far back as the rear end of the blades 18 of the small spinner 11. As the lure is drawn through the water the spoon 24 is free to rotate with the bearing member 21, about the shaft 12.

The bearing member 21 is spaced forwardly from the rear spinner 11 by a plurality of beads or bearings 26, loosely carried by the shaft 12.

In the use and operation of this fishing lure 10, as it is drawn through the water both of the spinners 11 and 20 will be rotated about the shaft 12. The smaller spinner 11 in normal use alone is hidden by the hook 15 as the fish approaches from the rear. By providing the larger spinner or spoon 20 about the smaller spinner 11 at least one spinner is in view from any angle, whether behind or to one side of the hook 15.

I do not mean to confine myself to the exact details of construction herein disclosed, but claim all variations falling within the purview of the appended claims.

What I claim is:

1. A fishing lure comprising an elongated shaft, a hook secured to the rear end of said shaft, a spinner rotatable about said shaft at the rear end thereof, said spinner having a pair of oppositely disposed blades, and a spoon pivotally and rotatably mounted on the front end of said shaft, said spoon extending rearwardly and overlying said rear spinner for engagement and rotation with said blades when said spoon is disposed substantially parallel to said shaft.

2. A fishing lure comprising an elongated shaft, a hook loosely carried by said shaft at the rear end thereof, a small spinner having blade structure on said shaft adjacent said hook, a U-shaped bearing member on the front end of said shaft, said shaft engaging loosely through the arms of said bearing, a plurality of beads on said shaft interposed between said bearing and said small spinner for the spacing apart thereof and a spoon pivotally secured to said bearing member for rotation about said shaft, said spoon extending rearwardly to a position adjacent to said spinner, and said spoon being engaged and rotated by the blade structure of said spinner in certain positions of said spoon.

FLOYD G. SWAN.

REFERENCES CITED

The following references are of record in the file of this patent:

UNITED STATES PATENTS

| Number | Name | Date |
|---|---|---|
| 1,294,281 | Law | Feb. 11, 1919 |
| 1,558,249 | DeZeng | Oct. 20, 1925 |
| 1,790,456 | Bennington | Jan. 27, 1931 |
| 1,822,785 | Petrie | Sept. 8, 1931 |
| 2,192,563 | Starkey | Mar. 5, 1940 |